United States Patent
Buschmann et al.

(10) Patent No.: US 9,587,937 B2
(45) Date of Patent: Mar. 7, 2017

(54) CONSTRUCTION MACHINE WITH SETUP ASSISTANCE SYSTEM FOR A SENSOR UNIT

(71) Applicant: JOSEPH VOEGELE AG, Ludwigshafen/Rhein (DE)

(72) Inventors: Martin Buschmann, Neustadt (DE); Achim Eul, Mannheim (DE); Jens Herrmann, Zeiskam (DE)

(73) Assignee: JOSEPH VOEGELE AG (DE)

( * ) Notice: Subject to any disclaimer, the term of this patent is extended or adjusted under 35 U.S.C. 154(b) by 466 days.

(21) Appl. No.: 14/105,538

(22) Filed: Dec. 13, 2013

(65) Prior Publication Data

US 2014/0165693 A1  Jun. 19, 2014

(30) Foreign Application Priority Data

Dec. 14, 2012 (EP) .................... 12008348

(51) Int. Cl.
*G01C 19/00* (2013.01)
*G01B 21/16* (2006.01)
(Continued)

(52) U.S. Cl.
CPC ............ *G01B 21/16* (2013.01); *B60W 30/12* (2013.01); *E01C 19/006* (2013.01);
(Continued)

(58) Field of Classification Search
None
See application file for complete search history.

(56) References Cited

U.S. PATENT DOCUMENTS

| 3,566,759 A | 3/1971 | Gurries |
| 4,948,292 A | 8/1990 | Haven et al. |

(Continued)

FOREIGN PATENT DOCUMENTS

| DE | 8806271 U1 | 8/1988 |
| DE | 69722992 T2 | 5/2004 |

(Continued)

OTHER PUBLICATIONS

Office Action for Chinese Patent Application No. 201310690416.6, Dated Aug. 7, 2015, 7 Pages, Applicant Joseph Voegele AG.

(Continued)

*Primary Examiner* — Robert R Raevis
(74) *Attorney, Agent, or Firm* — Brooks Kushman P.C.

(57) ABSTRACT

A construction machine includes a sensor unit having a measurement range. The sensor unit is variable in its orientation relative to the construction machine, whereby position or orientation of the measurement range relative to the construction machine is also variable. The sensor unit is configured for detecting position of an external reference. The construction machine further includes a setup assistance system including a display configured to indicate to an operator while the sensor unit is oriented relative to the reference in which direction the sensor unit has to be moved in order for the reference to be located in the measurement range. The sensor unit is configured to detect a position of the reference relative to the sensor unit in at least two dimensions, and the display is configured to display the position of the reference relative to the measurement range for the at least two detected dimensions simultaneously.

20 Claims, 3 Drawing Sheets

(51) Int. Cl.
*B60W 30/12* (2006.01)
*E01C 19/00* (2006.01)
*G01S 15/88* (2006.01)
*G01S 17/88* (2006.01)

(52) U.S. Cl.
CPC ............ *E01C 19/008* (2013.01); *G01S 15/88* (2013.01); *G01S 17/88* (2013.01)

(56) References Cited

U.S. PATENT DOCUMENTS

| | | | |
|---|---|---|---|
| 5,327,345 A | 7/1994 | Nielsen et al. | |
| 5,917,593 A | 6/1999 | Hirano et al. | |
| 6,665,067 B2* | 12/2003 | Ogawa et al. | ................ 356/247 |
| 6,784,808 B2* | 8/2004 | Hoetzel et al. | ............ 340/932.2 |
| 2003/0075943 A1* | 4/2003 | Kirchhoff | ................ B60P 3/14 |
| | | | 296/26.11 |
| 2003/0226290 A1 | 12/2003 | Savard et al. | |
| 2004/0068896 A1 | 4/2004 | Sehr | |
| 2004/0071509 A1 | 4/2004 | Frankeny, II | |
| 2006/0163300 A1* | 7/2006 | Kramer | .................... B60R 9/00 |
| | | | 224/405 |
| 2009/0015389 A1* | 1/2009 | Seehaus et al. | .............. 340/435 |
| 2009/0231116 A1* | 9/2009 | Takahashi et al. | ........... 340/461 |
| 2010/0215433 A1 | 8/2010 | Fritz | |
| 2015/0077236 A1* | 3/2015 | Le Masurier | ................. 340/435 |

FOREIGN PATENT DOCUMENTS

| | | |
|---|---|---|
| EP | 2006448 A1 | 12/2008 |
| FR | 2932465 | * 12/2009 |
| JP | H0813412 A | 1/1996 |

OTHER PUBLICATIONS

Japanese Office Action Dated Jan. 6, 2015, Application No. 2013-233262, Applicant Joseph Voegele AG, Dispatch No. 675092, Reference No. GM1310059, 3 Pages.

European Search Report Dated May 6, 2013, Application No. 12008348.0-1604, Applicant Joseph Voegele AG, 7 Pages.

* cited by examiner

CONSTRUCTION MACHINE WITH SETUP ASSISTANCE SYSTEM FOR A SENSOR UNIT

CROSS-REFERENCE TO RELATED APPLICATIONS

This application claims foreign priority benefits under 35 U.S.C. §119(a)-(d) to European patent application number EP 12 008 348.0, filed Dec. 14, 2012, which is incorporated by reference in its entirety.

TECHNICAL FIELD

The present disclosure relates to construction machines including at least one sensor unit, and to a method for setting up at least one sensor unit on such construction machines.

BACKGROUND

Such construction machines are known in practice. The sensor units serve to monitor various operational parameters of the construction machine and the work result thereof. Moreover, on the basis of the data gained, various operational parameters of the construction machine can be adapted for achieving a work result that is as good as possible.

Some sensor units of such types are based on sensing an external reference. These may e.g., be existing structures on the site, a wire or a laser reference, as is e.g., disclosed in US 2004/0068896 A1 or U.S. Pat. No. 5,917,593 A. To ensure a proper function during operation, such sensor units have to be set up prior to operation such that they are able to detect the position of the external reference as accurately as possible. To this end the sensor unit is arranged on the construction machine such that the external reference is located during operation in an area in which the sensor(s) of the sensor unit can detect it as accurately as possible. For a long time this process has been carried out by the operating personnel exclusively by hand. For this purpose the measurement range of the sensor unit, e.g. a distance from a sensor, had to be known. For instance, the sensor unit was oriented relative to the external reference and the distance between the two was checked with a yardstick.

In the meantime, however, there are also construction machines comprising setup assistance systems for sensor units. Most of the times, these are sensor units for detecting a plane reference defined by a rotation laser. The laser sensor will be shifted in vertical direction until the rotation laser hits as centrally as possible on the sensor area. The operator is informed by LED's whether the receiver has to be shifted upwards or downwards. Some of these systems also employ a motorized or automated shifting of the receiver.

Such conventional setup assistance systems have the disadvantage that they are exclusively suited for the setup of sensors that detect a planar reference, such as e.g., a plane formed by a rotation laser. Sensor units for linear references, such as e.g., a static laser beam, can be set up only inadequately with the existing systems.

SUMMARY

It is therefore an object of the present disclosure to provide a construction machine which comprises a setup assistance system for sensor units which is suited for many different sensor units based on different principles.

The construction machine according to the disclosure is characterized in that it comprises a setup assistance system for a sensor unit which detects a position of a reference relative to the sensor unit in at least two dimensions, and the setup assistance system contains a display configured to simultaneously display the position of the reference relative to a measurement range of the sensor unit for the at least two detected dimensions. This considerably facilitates the setup of the sensor unit for an operator also in cases where a linear external reference is used. For instance, in the case of a reference wire which is to be sensed by an ultrasonic sensor, both the horizontal and the vertical position of the reference wire relative to the sensor unit can be detected and displayed. This enables the operator to position the reference wire both horizontally and vertically centered in a measurement range of the sensor unit. However, the detected and displayed dimensions need not exclusively be translational dimensions. Rather, the detection and display of rotatory dimensions may also be provided. In this way it can for instance be ensured that the direction of movement of the sensor unit is in parallel with the reference during operation of the construction machine.

The display may e.g., include LED's. These may e.g., be arranged such that the illumination of individual LED's or various combinations of LED's indicates to the operator how the sensor unit has to be moved to be optimally oriented or to directly display the position of the reference relative to the sensor unit. The display may, however, also be any desired visual display element, e.g., an alphanumeric or an LCD display.

It may be advantageous when at least one respective associated display element is provided for each dimension displayed. This facilitates a fast reading. The display elements may be respectively identical elements. It is however also possible to provide different elements for different dimensions. Specifically, different display elements may be used for rotatory dimensions than for translational dimensions.

It is particularly advantageous if at least one drive is provided for adapting the orientation of the sensor unit relative to the reference. This further facilitates the setting up of the sensor unit for the operating personnel. Moreover, a correspondingly selected drive can allow a finer adjustment of the orientation.

In one variant, the drive may be manually controllable.

In a further variant, the drive may be controllable in automated fashion on the basis of the detected position of the reference relative to the sensor unit. This reduces the time needed by the operating personnel for the setup of the sensor unit to a minimum degree.

Moreover, it may be advantageous when the sensor unit comprises not only one, but a plurality of sensors. These may be a plurality of identical or different sensors. The use of plural sensors can increase the number of possible uses on the one hand and permit a more precise detection of the reference on the other hand.

It is conceivable that the construction machine is a road paver or a feeder.

The disclosure also refers to a method for setting up at least one sensor unit on a construction machine. The sensor unit is here oriented relative to an external reference. The position of said reference relative to the sensor unit is here detected by a setup assistance system in at least two dimensions. Based on the detected positional data, the position of the reference relative to a measurement range of the sensor unit is displayed by a display of the setup assistance system in two dimensions. The area in which the sensor unit provides the most accurate measurement results is called measurement range. On the basis of the information displayed, the sensor unit can now be adjusted in its orientation relative to the reference. Since at least two dimensions of the position of the reference relative to the measurement range are detected and displayed, the sensor unit can be more exactly oriented relative to the reference. Specifically in the case of linear references, such as e.g., a wire reference, a display according to the invention is helpful.

It is conceivable that LED's are used for the display. These can be arranged in different ways, which allow for an intuitive reading. However, alphanumeric or liquid crystal displays, for instance, may also be used.

It is particularly advantageous when at least one drive is used for the orientation of the sensor unit.

In one variant, said drive can be controlled manually.

In a further advantageous variant, the drive is controllable in automated fashion on the basis of the detected position of the reference relative to the sensor unit.

It is conceivable that the construction machine is a road paver or a feeder.

The disclosure refers to a construction machine comprising a setup assistance system for at least one sensor unit and to a method for setting up at least one sensor unit on a construction machine.

An advantageous embodiment of the disclosure is explained in more detail hereinafter with reference to the attached drawings.

DETAILED DESCRIPTION

Figure 1:
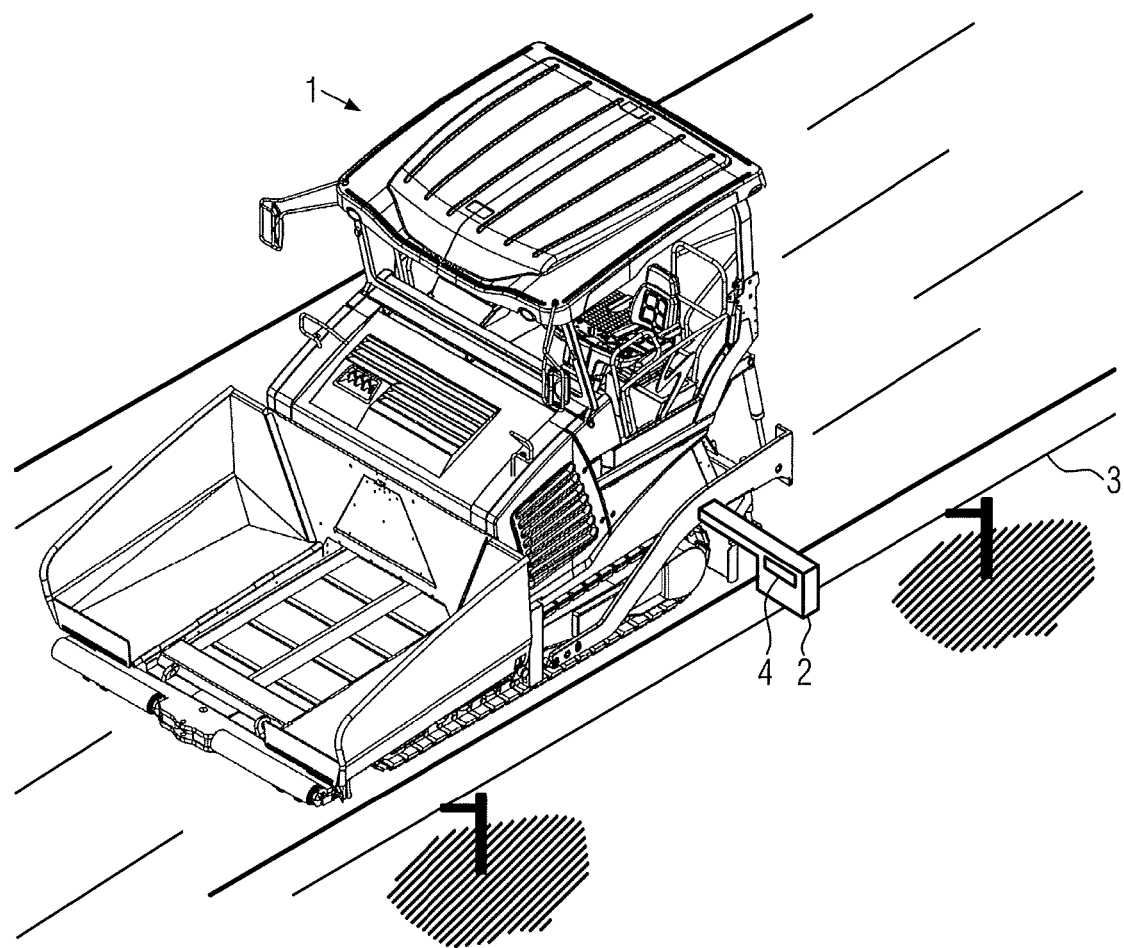
FIG. 1 shows a construction machine with a sensor unit which senses an external reference.

FIG. 1 shows a construction machine 1, in this case a road paver, which with the help of a sensor unit 2 senses a reference 3. In the depicted embodiment, this is a linear wire reference. However, any desired type of reference 3, such as a laser beam or ground structures on the site, is possible. In the present embodiment, the combination of reference 3 and sensor unit 2 may serve to control the installation height. Any desired intended uses in which an external reference 3 is sensed are, however, possible. A display 4 is arranged on the sensor unit 2. However, it is also conceivable to arrange the display 4 at any other desired position on the construction machine 1, for instance in the area of a driver's cab or on other operating elements.

Figure 2:
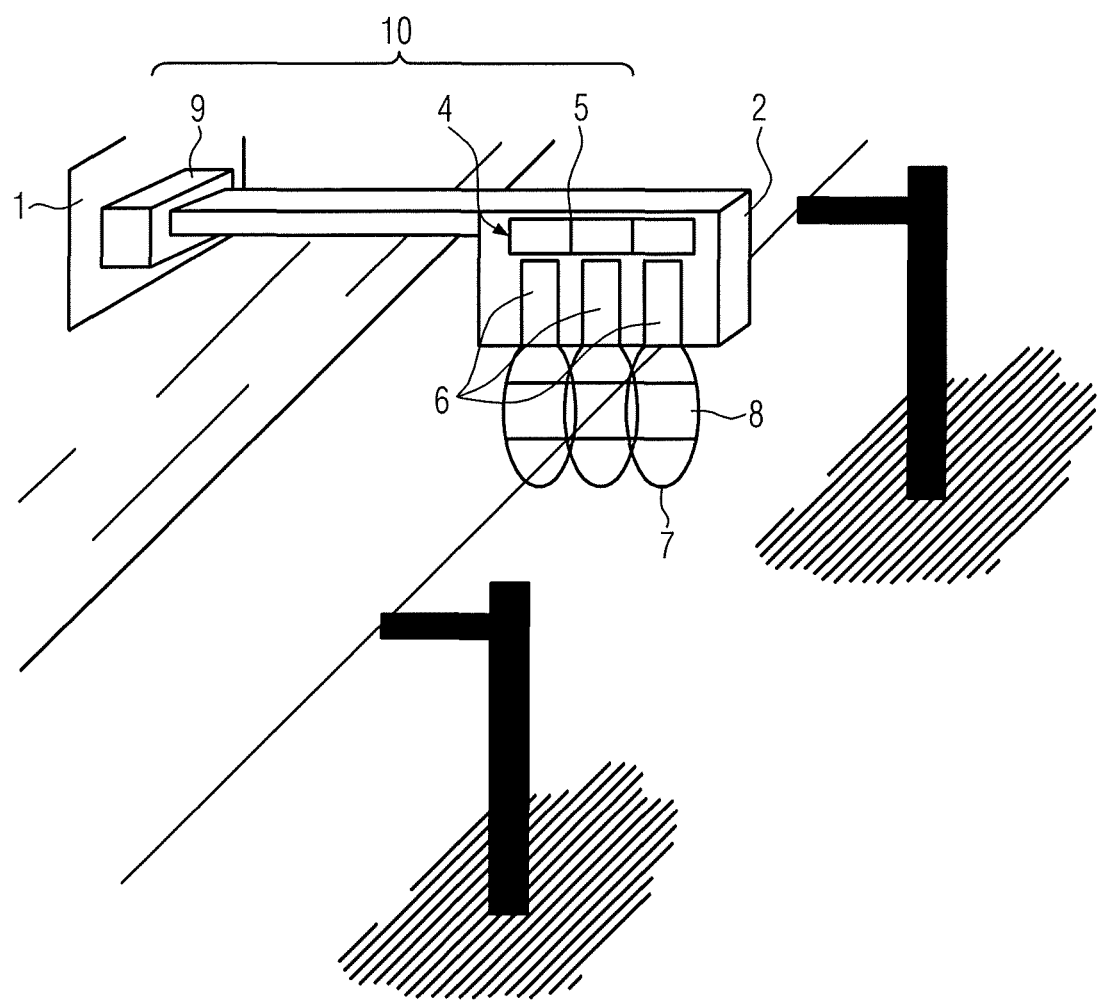
FIG. 2 is a more detailed view of the sensor unit and the reference.

FIG. 2 shows the sensor unit 2 in detail. As can now be seen, the display 4 comprises three display elements 5. Moreover, it can be seen that the sensor unit 2 comprises three ultrasonic sensors 6 in the present embodiment. Any desired number of sensors 6 with any desired measuring principles may however be provided. In the present embodiment, each of the sensors 6 emits an ultrasonic lobe 7 and additionally comprises a respective measurement range 8 in which the most accurate measurement results are achievable. The sensor unit 2 has to be oriented such that the reference 3 is positioned within the measurement range 8. In the illustrated embodiment, a drive 9 is provided for adapting the orientation of the sensor unit 2. In this case the drive 9 together with the display 4 with the display elements 5 and evaluation electronics (not shown), which determines the position of the reference 3 on the basis of the data measured by the sensors 6, form a setup assistance system 10. The system, however, may also only consist of the display 4 and the evaluation electronics.

FIGS. 3 to 6 show a first embodiment for the display 4. Here, plural LED's 11 are arranged in two straight lines extending at a right angle relative to one another. Each line is here provided as an associated display element 5 with respect to a specific dimension. In the present embodiment, the horizontal and the vertical position of the reference 5 relative to the measurement range 8 of the sensor unit 2 is displayed.

Figure 3:
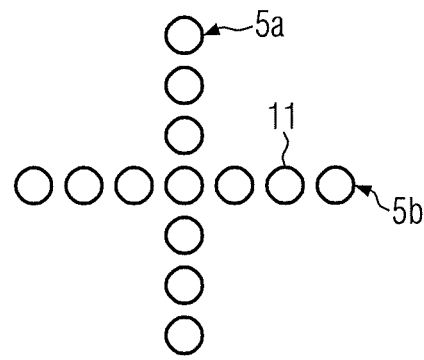
FIGS. 3 to 8 show different arrangements of LED's which are suited for the at least two-dimensional display of the position of the external reference relative to the sensor unit. The circles filled out in black represent illuminated LED's; the white circles with black border represent non-illuminated LED's.
Figure 4:
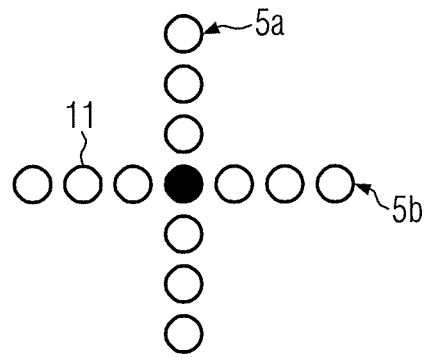

The vertical position is here displayed by a vertical display element 5a; the horizontal position by a horizontal display element 5b. In FIG. 3, none of the LED's 11 is shown illuminated, which is depicted by the white circles with black border. In FIG. 4, the central LED 11 is shown illuminated, symbolized by the circle filled out in black. It is thereby indicated that the wire reference 3 is positioned both horizontally and vertically centered in the measurement range 8.

Figure 5:
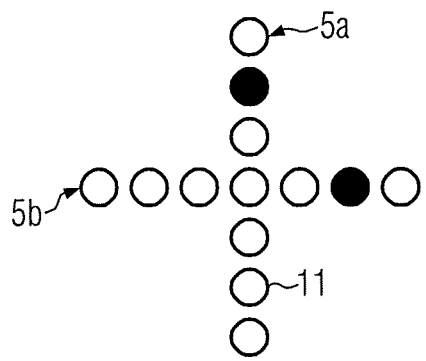
Figure 6:
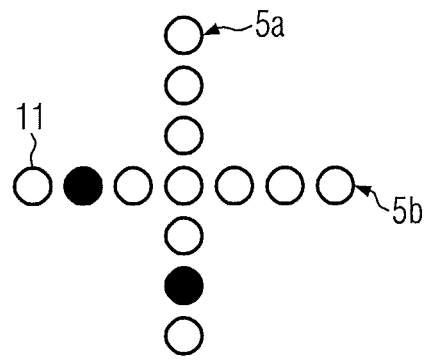

In FIG. 5, two of the LED's 11 are shown illuminated. It is here indicated that the wire reference is located too far towards the top and too far towards the right. The operator thereby knows that he must shift the sensor unit 2 upwards and to the right. FIG. 6 shows the display for a deviation of the wire reference 3 downwards and to the left.

Figure 7:
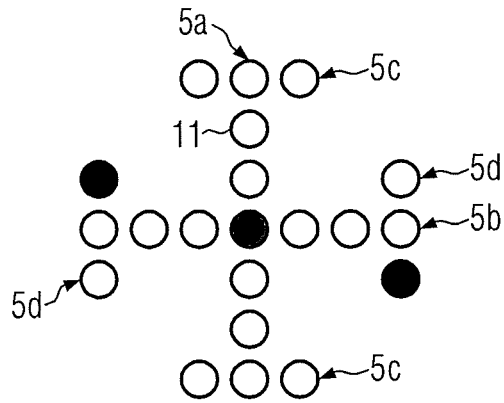
Figure 8:
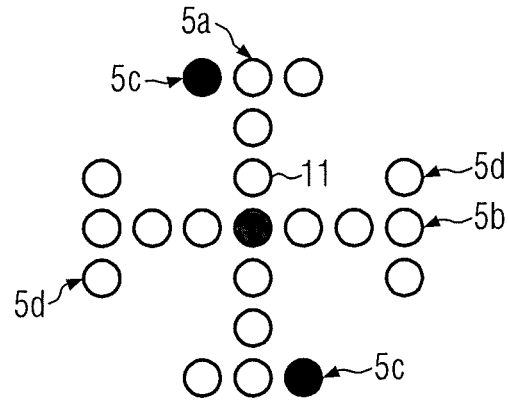

FIGS. 7 and 8 show a modified variant of the first embodiment. The two lines of LED's 11 extending at a right angle relative to one another have been enhanced by the further display elements 5c and 5d. The display element for the vertical rotation 5c indicates to the operator whether and in which direction the sensor unit 2 must be rotated about a vertical axis to be optimally oriented. The display element for the rotation about a horizontal axis 5d indicates to the operator whether and in which direction the sensor unit 2 must be rotated about a horizontal axis to achieve an orientation as optimal as possible relative to the external reference 3. In FIG. 7 it is signalized to the operator that there is a rotatory deviation about a horizontal axis in clockwise direction and that the sensor unit 2 has to be rotated about a horizontal axis in clockwise direction. It is signalized in FIG. 8 that there is a rotatory deviation about a vertical axis in counterclockwise direction, and the sensor unit has to be rotated about a vertical axis in counterclockwise direction. Both in FIG. 7 and in FIG. 8, the central illuminated LED 11 signalizes that a translational adaptation of the orientation is not needed.

The construction machine 1 may be any desired construction machine that comprises sensor units 2 which have to be oriented relative to an external reference 3. In particular, the machine may also be a feeder.

The sensors 6 may be any desired types of sensors, such as light sensors, pressure sensors or deflection sensors. Likewise, the reference 3 may be any desired reference medium which is suited for use with the respective sensor 6 and the underlying measurement principle, respectively.

The drive 9 may be manually controllable or may be controllable in automated fashion on the basis of the detected position data of the reference 3. It is also conceivable that both types are possible. For instance, the operator could perform a rough adjustment and let the fine adjustment take place in automated fashion. The manual control can be carried out by any desired operating element of the construction machine 1. This element may be positioned at any desired place, such as e.g., in the driver's cab of the construction machine 1.

The LED's 11 of the display 4 can be arranged in any desired way, thereby permitting an intuitive reading of the display 4. Alphanumeric displays may be used just as well. Moreover, LCD's may be used that permit a variety of graphic displays. Elaborate, pictorial information or instructions to the operator are then also conceivable.

The setup assistance system 10 need not necessarily use optical signals to transmit information to the operator. Variants are also conceivable that use e.g., acoustic signals or vibrations.

Whenever a drive 9 and an automated setup are provided, variants of the setup assistance system 10 are also conceivable that are without any display 4. In such a case the setup process would take place automatically without the operator's help. The display of the current position of the reference 3 or of the necessary direction of movement would then not be required.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A construction machine comprising:
    a sensor unit which has a measurement range, the sensor unit being variable in its orientation relative to a portion of the construction machine, whereby position or orientation of the measurement range relative to the portion of the construction machine is also variable, the sensor unit being configured for detecting position of an external reference; and
    a setup assistance system for the sensor unit, the setup assistance system including a display which is configured to indicate to an operator while the sensor unit is oriented relative to the reference in which direction the sensor unit has to be moved in order for the reference to be located in the measurement range of the sensor unit;
    wherein the sensor unit is configured to detect position of the reference relative to the sensor unit in at least two dimensions, and the display is configured to display the position of the reference relative to the measurement range of the sensor unit for the at least two detected dimensions simultaneously, and wherein the reference comprises a linear wire, a laser beam, or a ground structure.

2. The construction machine according to claim 1 wherein the display comprises LED's.

3. The construction machine according to claim 1 wherein the display comprises at least one respective display element for each dimension displayed.

4. The construction machine according to claim 1 wherein the setup assistance system further comprises a drive for adapting the orientation of the sensor unit relative to the reference.

5. The construction machine according to claim 4 wherein the drive is configured to adjust the orientation of the sensor unit relative to the portion of the construction machine.

6. The construction machine according to claim 4 wherein the drive is manually controllable.

7. The construction machine according to claim 4 wherein the drive is controllable in automated fashion on the basis of the detected position of the reference relative to the sensor unit.

8. The construction machine according to claim 1 wherein the sensor unit comprises one or a plurality of sensors.

9. The construction machine according to claim 1 wherein the construction machine is a road paver or a feeder.

10. The construction machine according to claim 1 wherein the reference comprises the linear wire.

11. The construction machine according to claim 1 wherein the reference comprises the laser beam.

12. A method for setting up at least one sensor unit on a construction machine, comprising:
    orienting a sensor unit relative to an external reference, wherein the reference comprises a linear wire, a laser beam, or a ground structure;
    detecting a position of the reference relative to the sensor unit by a setup assistance system;
    displaying the position of the reference relative to a measurement range of the sensor unit by a display of the setup assistance system; and
    adjusting the orientation of the sensor unit relative to the reference and relative to the construction machine based on information outputted by the display;
    wherein at least two dimensions of the position of the reference relative to the measurement range of the sensor unit are detected and simultaneously displayed.

13. The method according to claim 12 wherein the display comprises LED's.

14. The method according to claim 12 wherein a drive is used for adjusting the orientation of the sensor unit.

15. The method according to claim 14 wherein the drive is manually controlled.

16. The method according to claim 14 wherein the drive is controlled in automated fashion on the basis of the detected position of the reference relative to the sensor unit.

17. The method according to claim 12 wherein the construction machine is a road paver or a feeder.

18. The method according to claim 12 wherein the reference comprises the linear wire.

19. The method according to claim 12 wherein the reference comprises the laser beam.

20. A construction machine comprising:
    a sensor unit which has a measurement range, the sensor unit being variable in its orientation relative to a portion of the construction machine, whereby position or orientation of the measurement range relative to the portion of the construction machine is also variable, the sensor unit being configured for detecting position of an external reference; and
    a setup assistance system for the sensor unit, the setup assistance system including a display which is configured to indicate to an operator while the sensor unit is oriented relative to the reference in which direction the sensor unit has to be moved in order for the reference to be located in the measurement range of the sensor unit;
    wherein the sensor unit is configured to detect position of the reference relative to the sensor unit in at least two dimensions, and the display is configured to display the position of the reference relative to the measurement range of the sensor unit for the at least two detected dimensions simultaneously, and wherein the display comprises a plurality of LED's arranged in two lines that extend at a right angle relative to one another.

* * * * *